US008854197B2

(12) United States Patent
Ikeda et al.

(10) Patent No.: US 8,854,197 B2
(45) Date of Patent: Oct. 7, 2014

(54) METHOD OF MONITORING VEHICLE SURROUNDINGS, AND APPARATUS FOR MONITORING VEHICLE SURROUNDINGS

(75) Inventors: Keigo Ikeda, Toyota (JP); Noboru Nagamine, Anjo (JP)

(73) Assignee: Aisin Seiki Kabushiki Kaisha, Kariya-shi (JP)

(*) Notice: Subject to any disclaimer, the term of this patent is extended or adjusted under 35 U.S.C. 154(b) by 294 days.

(21) Appl. No.: 13/318,585

(22) PCT Filed: Mar. 15, 2010

(86) PCT No.: PCT/JP2010/054339
§ 371 (c)(1), (2), (4) Date: Nov. 2, 2011

(87) PCT Pub. No.: WO2010/140418
PCT Pub. Date: Dec. 9, 2010

(65) Prior Publication Data

US 2012/0056734 A1 Mar. 8, 2012

(30) Foreign Application Priority Data

Jun. 3, 2009 (JP) ................................ 2009-133908

(51) Int. Cl.
*B60Q 1/00* (2006.01)
*G08G 1/16* (2006.01)
*G07C 9/00* (2006.01)

(52) U.S. Cl.
CPC ............ *G08G 1/165* (2013.01); *G07C 9/00309* (2013.01)
USPC ........................................ 340/425.5; 340/435

(58) Field of Classification Search
USPC ................................................ 340/425.5, 435
See application file for complete search history.

(56) References Cited

U.S. PATENT DOCUMENTS

| | | | | |
|---|---|---|---|---|
| 4,897,630 A * | 1/1990 | Nykerk | .................... | 340/426.25 |
| 5,281,949 A * | 1/1994 | Durley et al. | ................. | 340/433 |
| 6,034,617 A * | 3/2000 | Luebke et al. | ............... | 340/5.62 |

(Continued)

FOREIGN PATENT DOCUMENTS

| | | |
|---|---|---|
| CN | 1457023 A | 11/2003 |
| CN | 1946174 A | 4/2007 |

(Continued)

OTHER PUBLICATIONS

Extended European Search Report dated Aug. 2, 2012 issued in European Patent Application No. 10783204.0.

(Continued)

*Primary Examiner* — Daniel Wu
*Assistant Examiner* — Emily C Terrell
(74) *Attorney, Agent, or Firm* — Sughrue Mion, PLLC

(57) ABSTRACT

A technology is provided for monitoring the surroundings of a vehicle in which a driver approaching the vehicle is recognized, obstacles present in the surroundings of the vehicle are searched for, obstacle information is generated for searched and found obstacles, and the driver outside of the vehicle is notified of the obstacle information. The driver approaching the vehicle can be recognized via communication with a mobile communication device carried by the driver. Additionally, the technology determines whether or not the searched and found obstacle is present in a blind spot area of the driver, and notifies the driver outside the vehicle of the obstacle information related to the obstacle when the obstacle is present in the blind spot area of the driver.

11 Claims, 8 Drawing Sheets

(56) References Cited

U.S. PATENT DOCUMENTS

| | | | | |
|---|---|---|---|---|
| 6,552,649 | B1 | 4/2003 | Okada et al. | |
| 6,696,931 | B2 * | 2/2004 | Paranjpe | 340/436 |
| 7,796,021 | B2 * | 9/2010 | Saban | 340/438 |
| 8,643,493 | B1 * | 2/2014 | Klitenick et al. | 340/573.1 |
| 2003/0210807 | A1 | 11/2003 | Sato et al. | |
| 2003/0222758 | A1 * | 12/2003 | Willats et al. | 340/5.72 |
| 2003/0222759 | A1 | 12/2003 | Amagasa et al. | |
| 2005/0024257 | A1 | 2/2005 | Britton | |
| 2006/0103529 | A1 * | 5/2006 | Ohmura et al. | 340/568.1 |
| 2007/0081262 | A1 | 4/2007 | Oizumi et al. | |
| 2007/0120644 | A1 * | 5/2007 | Seike | 340/5.61 |
| 2007/0182528 | A1 * | 8/2007 | Breed et al. | 340/435 |
| 2007/0279206 | A1 * | 12/2007 | Singfield | 340/457 |
| 2008/0129539 | A1 | 6/2008 | Kumon | |
| 2009/0079553 | A1 | 3/2009 | Yanagi et al. | |
| 2010/0289885 | A1 * | 11/2010 | Lu et al. | 348/61 |

FOREIGN PATENT DOCUMENTS

| | | | |
|---|---|---|---|
| CN | 101055176 | A | 10/2007 |
| CN | 101277432 | A | 10/2008 |
| CN | 101396989 | A | 4/2009 |
| DE | 102007045223 | A1 | 2/2008 |
| JP | 2000-073635 | A | 3/2000 |
| JP | 2002-211311 | A | 7/2002 |
| JP | 2002-269697 | A | 9/2002 |
| JP | 2004-003152 | A | 1/2004 |
| JP | 2005-115853 | A | 4/2005 |
| JP | 2005-186659 | A | 7/2005 |
| JP | 2007-182117 | A | 7/2007 |
| JP | 2008-213735 | A | 9/2008 |

OTHER PUBLICATIONS

English Translation of International Preliminary Report on Patentability for PCT/JP2010/054339 dated Jan. 26, 2012.

International Search Report, PCT/JP2010/054339, Jun. 22, 2010.

Chinese Office Action, dated Jul. 1, 2013, issued in corresponding Chinese Patent Application No. 201080024138.5.

Chinese Office Action issued Mar. 4, 2014 in Chinese Patent Application No. 201080024138.5.

* cited by examiner

METHOD OF MONITORING VEHICLE SURROUNDINGS, AND APPARATUS FOR MONITORING VEHICLE SURROUNDINGS

CROSS REFERENCE TO RELATED APPLICATIONS

This application is a National Stage of International Application No. PCT/JP2010/054339 filed Mar. 15, 2010, claiming priority based on Japan Patent Application No. 2009-133908 filed Jun. 3, 2009, the contents of all of which are incorporated herein by reference in their entirety.

TECHNICAL FIELD

The present invention relates to a technology for monitoring whether or not an obstacle is present in the surroundings of a vehicle, and notifying a driver of necessary information.

BACKGROUND ART

When there is a pedestrian or some other object in the area on the side of a vehicle opposite the driver seat that tends to be a blind spot from the driver seat, drivers are often unaware of it. Therefore, a technology for monitoring the surroundings of a vehicle has been described in Patent Document 1 in which the driver of the vehicle is notified of the presence of an object near the vehicle in the blind spot from the driver seat immediately before departure. The technology for monitoring the surroundings of a vehicle in Patent Document 1 includes an onboard camera for viewing the surroundings of the vehicle in the blind spot from the driver seat, motion detecting means for detecting the presence of an object moving around the vehicle, and vehicle departure detecting means for detecting that the vehicle is about to depart. When it has been detected that the vehicle is about to depart, and the presence of an object moving in the blind spot has been detected by the motion detecting means, images of the blind spot area taken by the onboard camera are displayed.

Also, in Patent Document 2, there is described an apparatus which determines the level of possible contact with an obstacle detected by a surroundings detector for detecting the presence of an obstacle surrounding a vehicle using a possible contact level determining process, and provides information based on the determined level of possible contact to alert the driver before departure or around the time of departure. In addition, this apparatus drives a brake actuator and throttle actuator to prevent departure of the vehicle based on the possible contact level determined by the possible contact level determining process.

Also, in Patent Document 3, there is described a driver assistance apparatus in which a moving object in the surroundings of a vehicle is detected via imaging means when the entry of a driver is detected from verification of an unlocked door based on the signal status of a door switch, and from verification of the driver sitting down based on the signal status of a seat sensor. In this driver assistance apparatus, when driver entry has been detected, a moving object in the surroundings of the vehicle is detected via the imaging means and stored as a captured object. When it has been detected that the driver is about to drive off in the vehicle, a moving object in the surroundings of the vehicle is detected via the imaging means. As a result, when a moving object in the surroundings of the vehicle detected from the start of driving is different from the captured object in storage, the driver is alerted.

Similarly, an apparatus for monitoring the surroundings of a vehicle is described in Patent Document 4 in which entry of a driver into a vehicle is detected, and obstacles surrounding the vehicle are monitored. This apparatus includes first detecting means for detecting whether a passenger (driver) is about to enter the vehicle, second detecting means for detecting whether the passenger has entered the vehicle, surroundings monitoring means for monitoring the surroundings of the vehicle, and notification means for notifying the passenger of the monitoring results of the surroundings monitoring means. First detection results from the first detecting means are received, the surroundings monitoring means is activated based on the first detection results, second detection results from the second detection means are received, and a passenger is notified by the notification means of the monitoring results from the surroundings monitoring means based on the second detection results.

As described above, the apparatus for monitoring the surroundings of a vehicle in the prior art provides information related to obstacles present in the surroundings of a vehicle which impede travel of the vehicle only after the driver has entered the vehicle, sat on the seat, and started to operate the vehicle. In the apparatus for monitoring the surroundings of a vehicle in Patent Document 4, the driver is notified of the situation surrounding the vehicle at an earlier stage than the other art which do not indicate the situation surrounding the vehicle until the driver has started to operate the vehicle. However, even in this case, notification is not received until the driver has sat down on the driver seat. Therefore, when it is necessary to verify the presence of an obstacle and to remove that obstacle, the driver has to get out of the driver seat and the vehicle to verify the presence of the obstacle.

[Patent Document 1] Japanese Laid-open Patent Application No. 2007-182117 (Paragraph Nos. [0002]-[0008], FIG. 5)

[Patent Document 2] Japanese Laid-open Patent Application No. 2002-269697 (Paragraph Nos. [0002]-[0021], FIG. 1)

[Patent Document 3] Japanese Laid-open Patent Application No. 2008-213735 (Paragraph Nos. [0033]-[0048], FIG. 3)

[Patent Document 4] Japanese Laid-open Patent Application No. 2005-115853 (Paragraph Nos. [0006]-[0016], FIG. 2)

SUMMARY OF THE INVENTION

An object of the present invention is to eliminate the hassle of forcing a driver to leave a vehicle once seated inside to verify the presence of an obstacle by notifying a driver about to enter a vehicle of the presence of an obstacle in the surroundings of the vehicle and, if necessary, prompting visual verification.

In order to achieve this object, the apparatus for monitoring the surroundings of a vehicle in the present invention comprises: an outside driver recognition unit for recognizing a driver approaching the vehicle; an obstacle information generating unit for generating obstacle information related to the presence of an obstacle in the surroundings of the vehicle; and a notification unit for notifying the recognized driver outside of the vehicle of the obstacle information from the obstacle information generating unit.

According to the above configuration, for example, when the outside driver recognition unit recognizes the driver approaching the vehicle to enter the vehicle, the driver is notified of obstacle information related to the presence of an obstacle in the surroundings of the vehicle generated by the obstacle information generating unit while the driver is still outside of the vehicle. Because of the notification, the driver at least is aware that the surroundings of the vehicle have to be checked to make sure there are no obstacles impeding travel. Because the driver has not yet entered the vehicle, he or she does not feel inconvenienced. The driver can easily look around the vehicle, especially in the area that is a blind spot, thereby increasing safety.

In the apparatus for monitoring the surroundings of a vehicle in the present invention, the obstacle information generating unit preferably begins to generate the obstacle information in response to the outside driver recognition unit having recognized the driver approaching the vehicle or about to enter the vehicle. In order to create the obstacle information, the operation of an electric device is required for detecting the outside obstacle and evaluating the detection results. When the obstacle is a moving object, the obstacle may move from the surroundings of the vehicle in a short period of time. Therefore, in order to provide effective notification of the obstacle information, generation of the obstacle information is preferably started at a stage when the driver approaching the vehicle or about to enter the vehicle is recognized.

In the apparatus for monitoring the surroundings of a vehicle in the present invention, the notification unit comprises a sound control signal generating unit for generating sound control signals used in order to output a sound to notify, or, preferably, give a suggestion to the driver outside of the vehicle of the presence of the obstacle; and the sound control signals are sent to a sound control module for driving and controlling a sound output device. Some passenger cars are equipped with a keyless entry system and a voice system which responds to a driver outside of the vehicle using a voice. Some systems artificially generate sounds resembling the sound of a door opening or closing and the sound of a door key being used to lock (or unlock) a door. When the vehicle is equipped with the sound control module for driving and controlling the sound output device, it can be utilized by installing the sound control signal generating unit for generating sound control signals to output sounds which notify or preferably suggest to the driver that the obstacle is present. When there is no obstacle near the vehicle, the normal opening/closing or locking/unlocking sound is outputted. When the obstacle is near the vehicle, a tonal sound characteristic of a warning or alert is outputted. This can notify or strongly suggest to the driver that he or she look around the vehicle. When a voice response function has been installed, the presence of the obstacle can be clearly announced by the voice. When the relative position of the obstacle to the vehicle, specifically the relative position of the obstacle to the driver, has been detected, the tone preferably changes based on the relative position.

The form of obstacle notification does not have to be sound output. Visual notification or suggestion can be provided using a light such as a lamp. For example, the driver can be warned by flashing a hazard lamp. The flashing interval or flashing intensity of various lamps can be changed, or the ON/OFF sequence of a plurality of lamps can be controlled to notify or preferably suggest to the driver both the distance of the obstacle to the vehicle and the position of the obstacle relative to the vehicle.

When the vehicle is equipped with a system enabling wireless communication with the driver outside of the vehicle such as the so-called smart entry system, the obstacle information generating unit in the apparatus for monitoring the surroundings of a vehicle in the present invention preferably starts generating the obstacle information in response to communication with a mobile radio device carried by the driver such as an IC card, an electronic key, or a smart key. In this configuration, a person approaching the vehicle can be properly recognized as a valid driver of the vehicle, and the valid driver can be notified of the obstacle information. This allows for effective and efficient control of the vehicle monitoring process.

In a vehicle equipped with a door detection system for detecting the driver touching the vehicle door, the notification unit preferably outputs the obstacle information based on the driver touching the vehicle door. Notification of the driver, especially notification using sound, is more effective when the driver is closer to the vehicle. This allows for efficient and effective notification using sound, even in very noisy environments such as an urban area.

When the driver approaches the vehicle or is about to enter the vehicle, the obstacles surrounding the driver side door can be confirmed visually. However, the area located to the rear of the vehicle on the other side is a blind spot. For example, crouching children are difficult to see in the blind spot area. Therefore, in an apparatus for monitoring the surroundings of a vehicle according to the present invention, a blind spot determining unit determines based on the obstacle information whether or not the obstacle is present in the blind spot area of the driver recognized by the outside driver recognition unit, and the notification unit notifies the driver of the obstacle information when the obstacle is present in the blind spot area. In this configuration, the driver is more strongly notified of the obstacle information when the obstacle is present in the blind spot area of the driver approaching the vehicle or about to enter the vehicle. This prompts the driver to look around the vehicle. For example, position coordinates surrounding the vehicle regarding the driver recognized by the outside driver recognition unit are provided; and the blind spot determining unit calculates the blind spot area surrounding the vehicle for the driver based on the position coordinates. Because the driver is a moving object moving towards the vehicle, the driver can be considered to be an obstacle approaching the vehicle at the time of detection. Thus, the obstacle detecting function can be used to determine the position of the driver with great precision.

The present invention is not just the apparatus for monitoring the surroundings of a vehicle described above. The present invention is also a program for monitoring the surroundings of a vehicle in which the functions of monitoring the surroundings of a vehicle in the apparatus are executed by a computer, and a method of monitoring the surroundings of a vehicle in which the flow of controls is regulated using the program.

For example, in order to achieve the object mentioned above, the present invention is a method of monitoring the surroundings of a vehicle, comprising the steps of: recognizing a driver approaching a vehicle; searching for obstacles present in the surroundings of the vehicle; generating obstacle information related to a searched and found obstacle; and notifying the driver outside of the vehicle of obstacle information.

Similarly, in order to achieve the object mentioned above the present invention is also a method of monitoring the surroundings of a vehicle, comprising the steps of: recognizing a driver approaching the vehicle via communication with a mobile communication device carried by the driver;

searching for obstacles present in the surroundings of the vehicle;

determining whether or not a searched and found obstacle is present in a blind spot area of the driver; and notifying the driver outside of the vehicle of obstacle information related to the obstacle when the obstacle is present in the blind spot of the driver.

A method of monitoring the surroundings of a vehicle with these steps has the same operational effects of the apparatus for monitoring the surroundings of a vehicle described above. The additional characteristics described above can also be applied to the method. This is also true of the program for monitoring the surroundings of a vehicle, which is substantially the same.

In order to properly end notifying the driver of the obstacle information, a preferred embodiment of the present invention includes a function which determines movement of the driver into the blind spot area, and ends notification in response to the driver moving into the blind spot area.

DESCRIPTION OF EMBODIMENTS

The following is an explanation of an embodiment of the present invention with reference to the drawings.

Figure 1:
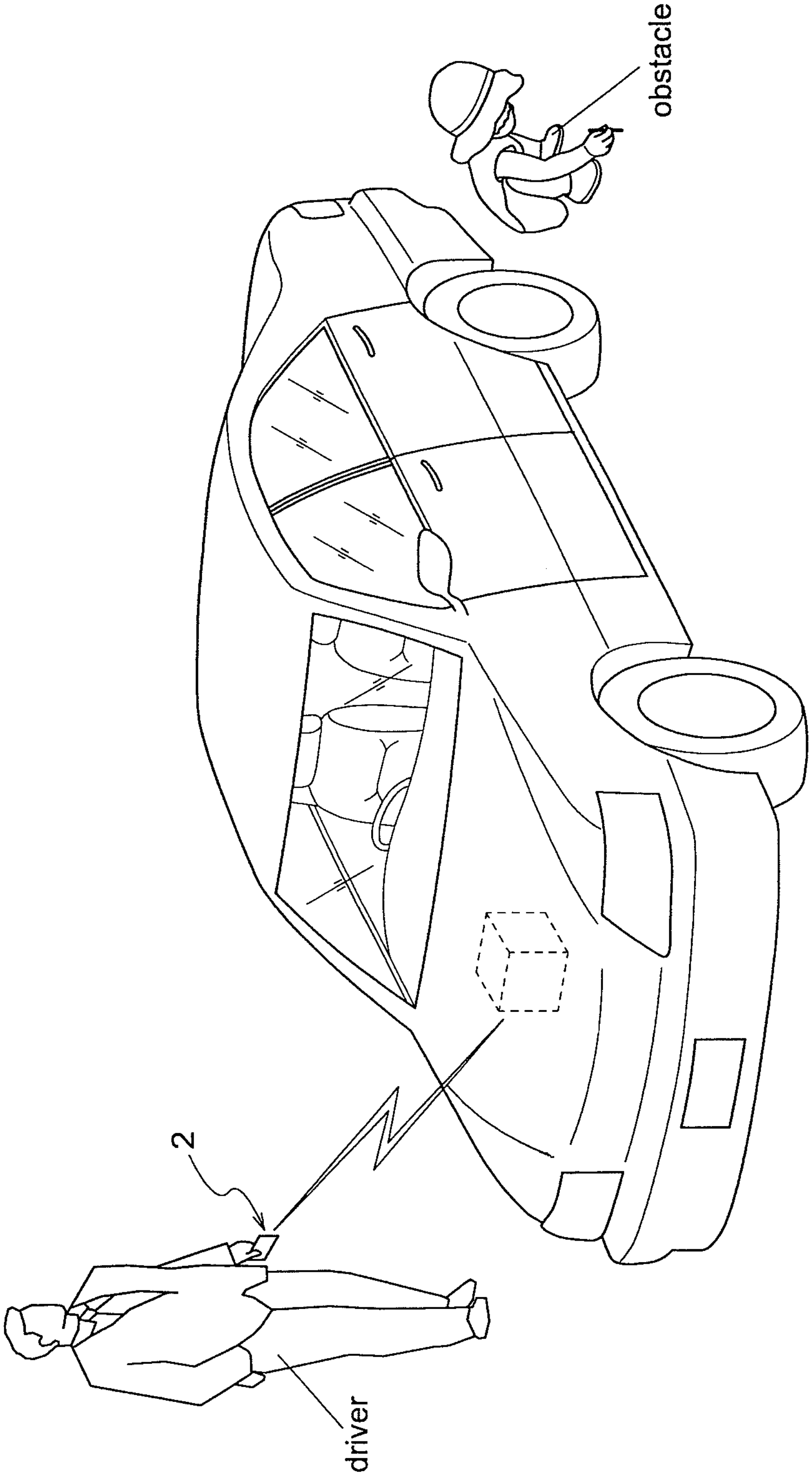
FIG. 1 is a perspective view of a passenger car serving as an example of a vehicle in which an apparatus for monitoring the surroundings of a vehicle according to the present invention has been mounted.

In FIG. 1, a passenger car serves as an example of a vehicle in which an apparatus for monitoring the surroundings of a vehicle according to the present invention has been mounted. Here, a small child is crouching near the rear left wheel of the vehicle, and is the obstacle to be verified. Because this vehicle has the steering wheel on the right side, the area on the left side of the vehicle near the rear wheel is a blind spot for a driver entering the parked vehicle. This vehicle includes a driver recognition system in which a driver about to enter the vehicle is recognized before entering the vehicle. Here, for example, the driver is carrying an IC card 2 such as a radio-type mobile device.

Figure 2:
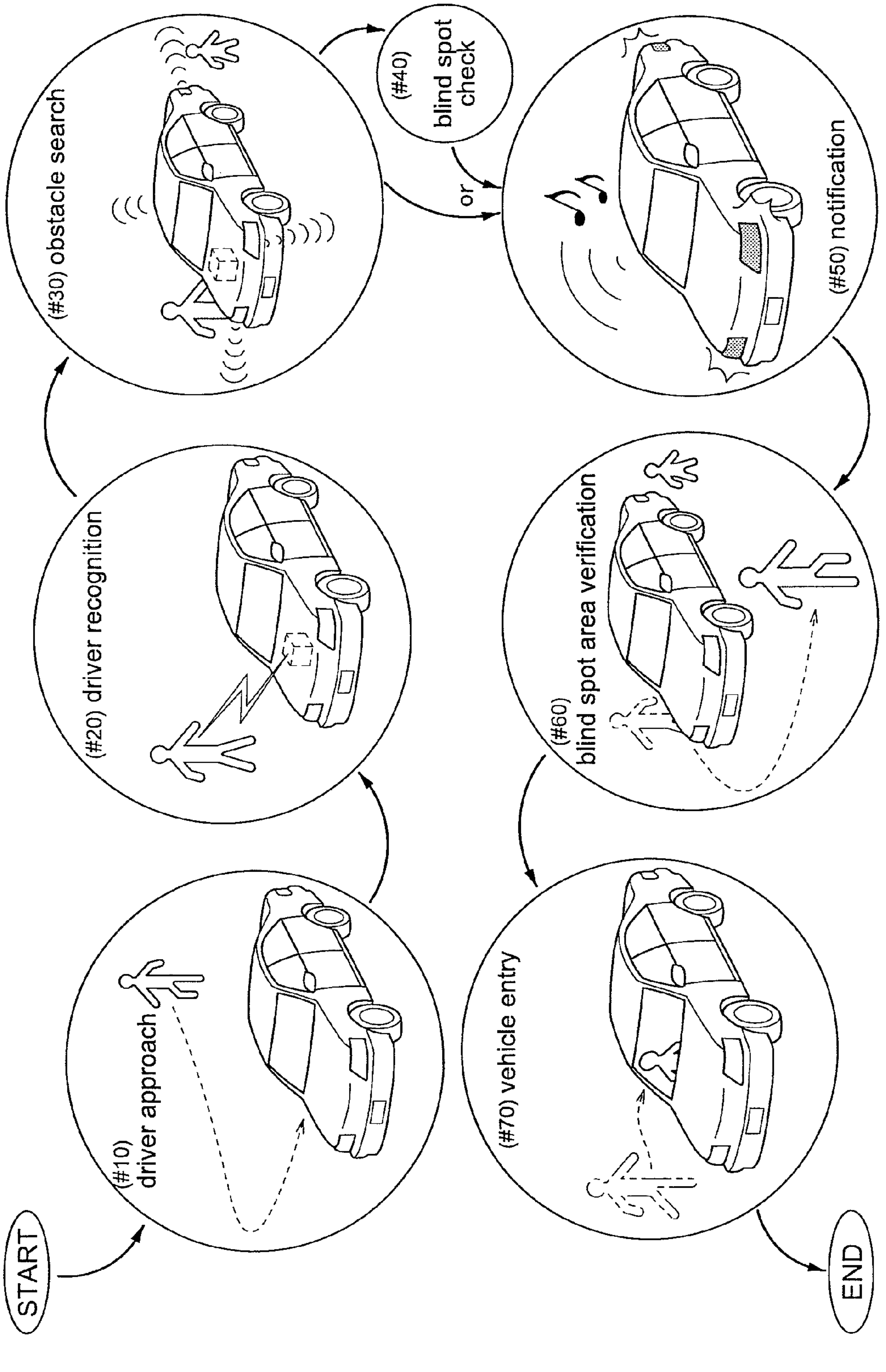
FIG. 2 is a flowchart showing the basic flow of a method for monitoring the surroundings of a vehicle.

FIG. 2 is a flowchart showing the basic flow of a method for monitoring the surroundings of a vehicle according to the present invention. First, the driver approaches the right front door of the parked vehicle (#10). By activating a driver recognition function using radio communication such as a smart entry system mounted in the vehicle, the driver about to enter the vehicle is recognized (#20). When a valid driver about to enter the vehicle has been recognized, obstacles present in the surroundings of the vehicle are searched for, and obstacle information is generated when an obstacle has been searched for and found (#30). In an optional method step, it can be determined whether or not the obstacle detected in the search is within the blind spot of the driver (#40). When an obstacle has been detected, in the next step the driver outside of the vehicle is notified of the obstacle information via an optical device or sound device (#50). When the blind spot area check has been included and an obstacle is present in the blind spot area of the driver, the driver can be notified of the obstacle information requiring special attention. Also, the driver outside of the vehicle can be notified of the obstacle information only when an obstacle is present in the blind spot area of the driver. When the driver about to enter the vehicle is notified of the obstacle information, a safety check is performed on the area surrounding the vehicle prior to entering the vehicle, especially in the blind spot area (#60). After performing the safety check on the area surrounding the vehicle, the driver enters the vehicle (#70).

Figure 3:
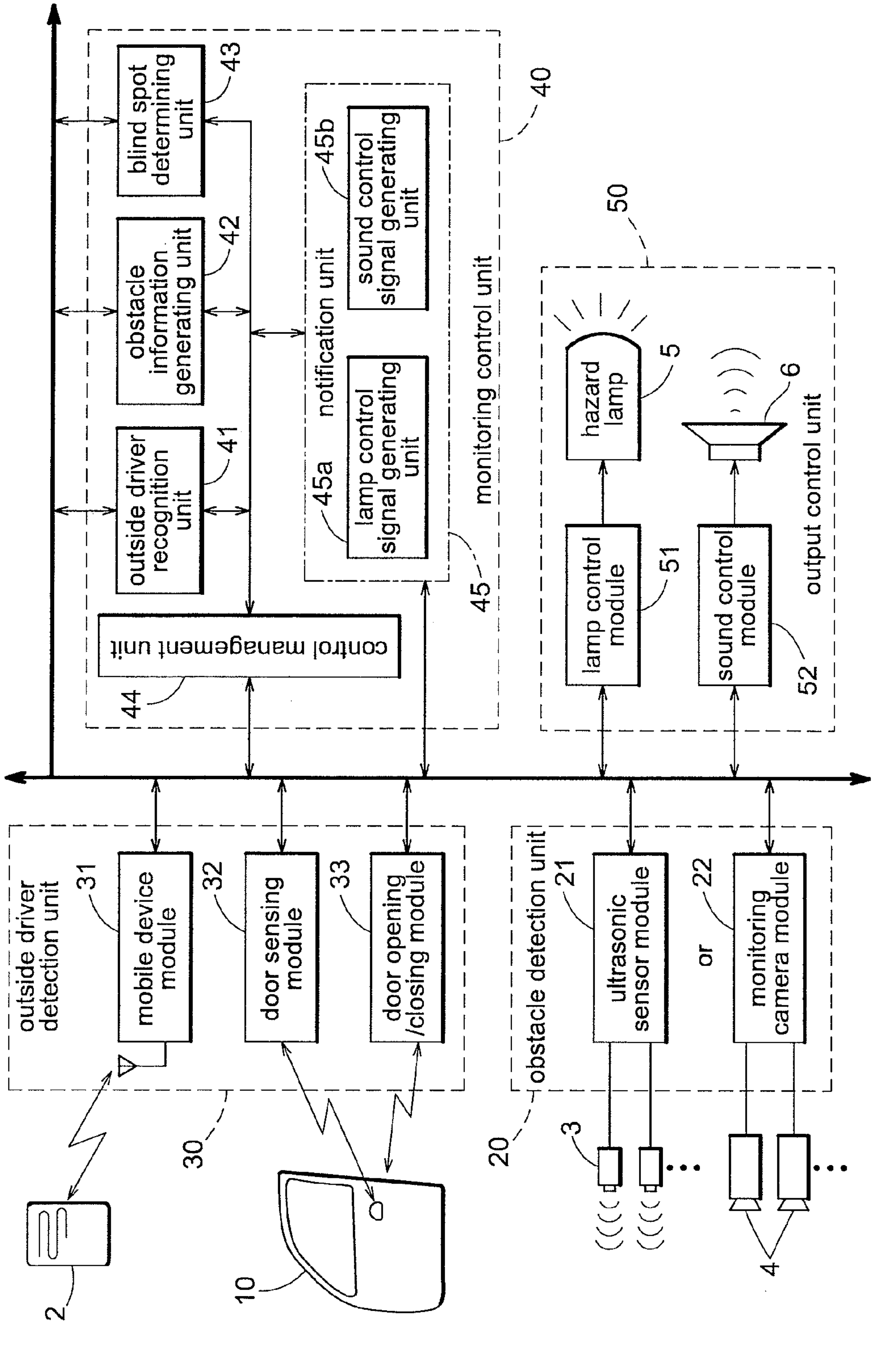
FIG. 3 is a functional block diagram showing schematically an example of an apparatus for monitoring the surroundings of a vehicle according to the present invention.

FIG. 3 is a system configuration diagram showing an apparatus for monitoring the surroundings of a vehicle according to an example of the present invention. This apparatus for monitoring the surroundings of a vehicle includes an obstacle detection unit 20 for detecting an obstacle in the area surrounding a vehicle, an outside driver detection unit 30 for detecting a driver outside of the vehicle, a monitoring control unit 40 having the core functions of the apparatus for monitoring the surroundings of a vehicle, and an output control unit 50 for controlling various types of output device mounted in the vehicle such as a lamp 5 (e.g., hazard lamp) and a speaker 6.

The hazard detection unit 20 includes an ultrasonic sensor module 21 connected to a plurality of ultrasonic sensors 3, and a monitoring camera module 22 connected to a plurality of onboard cameras 4. Ultrasonic sensors 3 are arranged at the end locations and a central location therebetween, on each of the front portion, the rear portion, the left side portion, and the right side portion of the vehicle. Objects (obstacles) present in the vicinity of area surrounding the vehicle can be detected based on reflected waves from these objects. The ultrasonic sensors 3 process the return time and amplitude of the reflected waves to estimate the distance of the object from the vehicle and the size of the object. In addition, processing detection results from all of the ultrasonic sensors 3 over time, movement and the lateral outside shape of the object can be estimated.

The monitoring camera module 22 displays the conditions surrounding the vehicle on a monitor not shown in the drawings. A detailed explanation of how this is mounted in an automobile has been omitted. The object (obstacle) surrounding the vehicle can be detected by incorporating an image processing function having an object detection algorithm into the monitoring camera module 22, or connecting the module to an image processing unit having such a function.

The outside driver detection unit 30 includes a mobile device module 31 for conducting radio data communication with the IC card 2 serving as a mobile device carried by the driver instead of a vehicle key, a door sensing module 32 for sensing a person touching the door handle, and a door opening/closing module 33 for controlling and detecting the opening/closing operation for the door 10.

The IC card 2 is verified via radio communication between the IC card carried by a driver facing the vehicle in order to enter the vehicle and a mobile device module 31 in the vehicle. Afterwards, operation of a door handle by the driver, such as the driver touching a door handle installed in a door 10, is detected by the door sensing module 32. The door opening/closing module unlocks the door 10 based on this detection, and the opening/closing operation of the door 10 is detected. While not shown in the drawings, the door handle includes a built-in transmitting antenna for transmitting request signals to the IC card 2, and a capacitive sensor for detecting whether a hand is approaching or has touched the door handle.

The output control unit 50 includes a lamp control module 51 for driving and controlling various types of lamp such as a hazard lamp 5, and a sound control module 52 for driving and controlling a sound output device such as a buzzer or speaker 6. The sound output device includes a sound effect generating vibrator for making a door unlocking sound (a sound notifying the driver that the door has been unlocked).

The monitoring control unit 40 includes an outside driver recognition unit 41 for recognizing a driver approaching the vehicle or about to enter the vehicle, an obstacle information generating unit 42 for generating obstacle information related to the presence of an obstacle in the area surrounding the vehicle, a blind spot determining unit 43 for determining based on the obstacle information whether or not the obstacle is present in the blind spot area of the driver recognized by the outside driver recognition unit 41, a notification unit 45 for notifying the recognized driver outside of the vehicle of the obstacle information from the obstacle information generating unit, and a control management unit 44 for managing the control operations for the various function units. The monitoring control unit 40 is connected to the high-speed units such as the obstacle detection unit 20, the outside driver recognition unit 30, and the output control unit 50 via an onboard LAN to facilitate data communication. Also, because the function units constituting the various units are connected via a data bus, the operations of the various function units can be operatively connected instantly to the operations of other function units.

For example, the obstacle information generating unit 42 can begin to generate obstacle information in response to the recognition of the valid driver through communication established between the outside driver recognition unit 41 and the IC card 2 as mobile device carried by a driver approaching the vehicle or about to enter the vehicle, based on signals sent from the outside driver detection unit 30. The obstacle information generated by the obstacle generating unit 42 can be outputted by the notification unit 45 via the output control unit 50 using a trigger such as the door sensing module 32 sensing tactile contact by the driver with the door 10 on the driver's side. Thus, the apparatus for monitoring the surroundings of a vehicle can output sound or light to the driver before entering the vehicle to suggest or indicate the presence of an obstacle. Auditory effects or visual effects can be used to bring to the driver's attention the situation surrounding the vehicle and indicate whether there are any obstacles that require attention. Notification of obstacle information can be a specific voice message or a flashing lamp. However, a technology in which a vehicle door unlocking sound different from the usual unlocking sound can also be used.

The following is an explanation with reference to FIG. 4 through FIG. 7 of the operation for monitoring the surroundings of a vehicle in the system described above.

Figure 4:
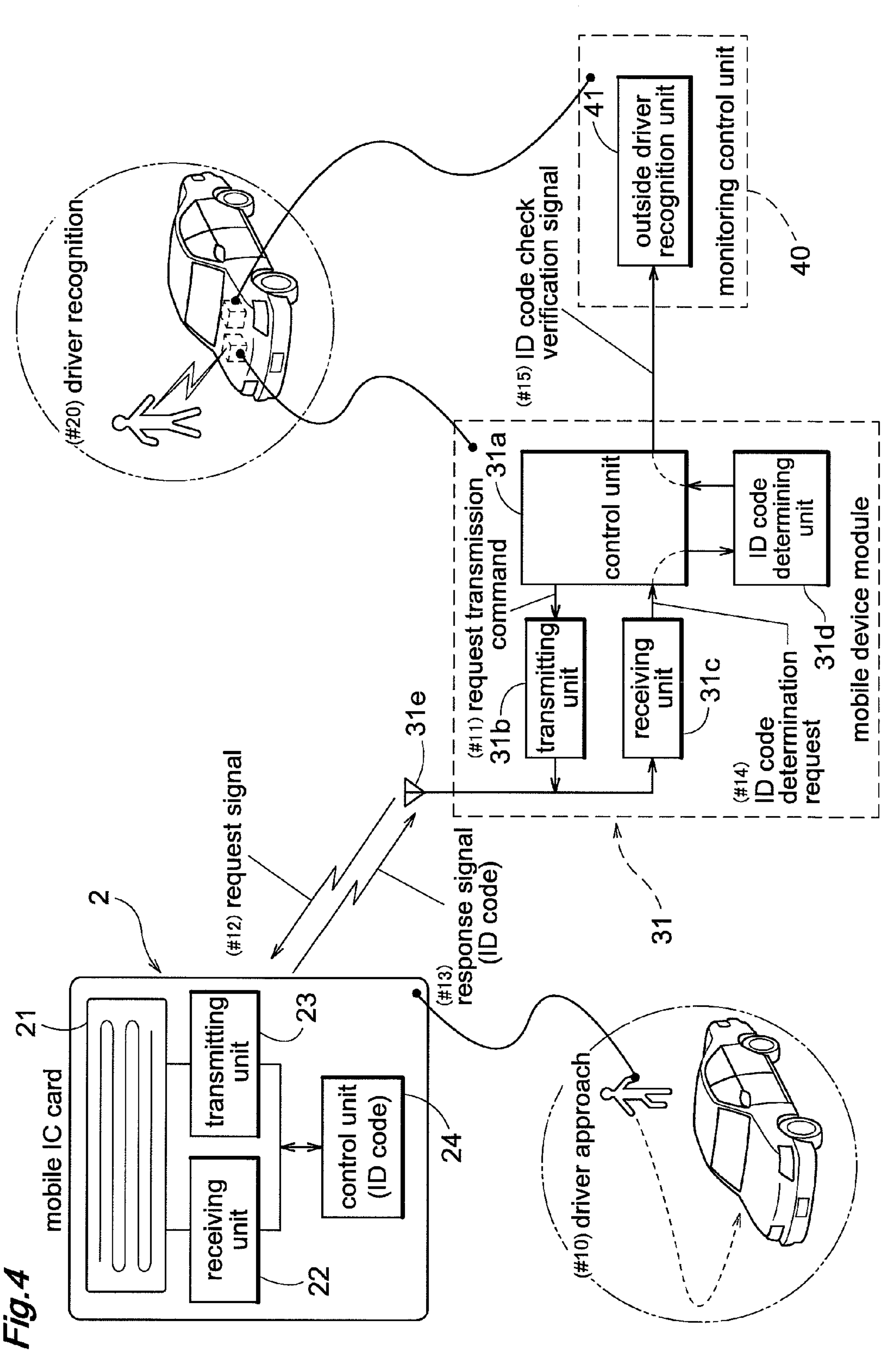
FIG. 4 is a schematic diagram showing control operations for recognizing a driver outside of a vehicle.

FIG. 4 schematically shows the devices operated from Step #10 to Step #20 in FIG. 2 and the controlled behavior of these devices. The control unit 31*a* in the mobile device module 31 included in the outside driver detection unit 30 sends request transmission commands to the transmitting unit 31*b* at a predetermined time interval (#11), and request signals are transmitted in the area surrounding the vehicle via an antenna unit 31*e* (#12). Usually, the IC card 2 carried by the driver has an antenna unit 21, a receiving unit 22, a transmitting unit 23, and a control unit 24 storing a unique ID code. When the IC card 2 is within range of the request signals from the mobile device module 31, the receiving unit 22 receives the request signals. When request signals have been received, response signals including the ID code are transmitted by the control unit 24 via the transmitting unit 23 and the antenna unit 21 (#13). When the response signals returned from the IC card 2 have been received by the receiving unit 31*c* in the mobile device module 31, the control unit 31*a* extracts the ID code included in the response signals, and a request is sent to the ID code determining unit 31*d* to determine whether or not the IC code the ID code has been registered to the IC card 2 for the owner of the vehicle (#14). When the ID code determining unit 31*d* has determined that the received ID code is valid, that is, when communication has been established with an IC card 2 carried by a valid driver, the control unit 31*a* sends ID code check confirmation signals to the monitoring control unit 40 indicating that the ID code in the IC card 2 for the driver of the vehicle has been received (#15). In this way, the outside driver recognition unit 41 recognizes the driver in the area surrounding the vehicle. Recognition controls for a series of drivers using a smart entry system of the prior art are explained in greater detail in, for example, Japanese Laid-open Patent Application No. 2007-254995.

Figure 5:
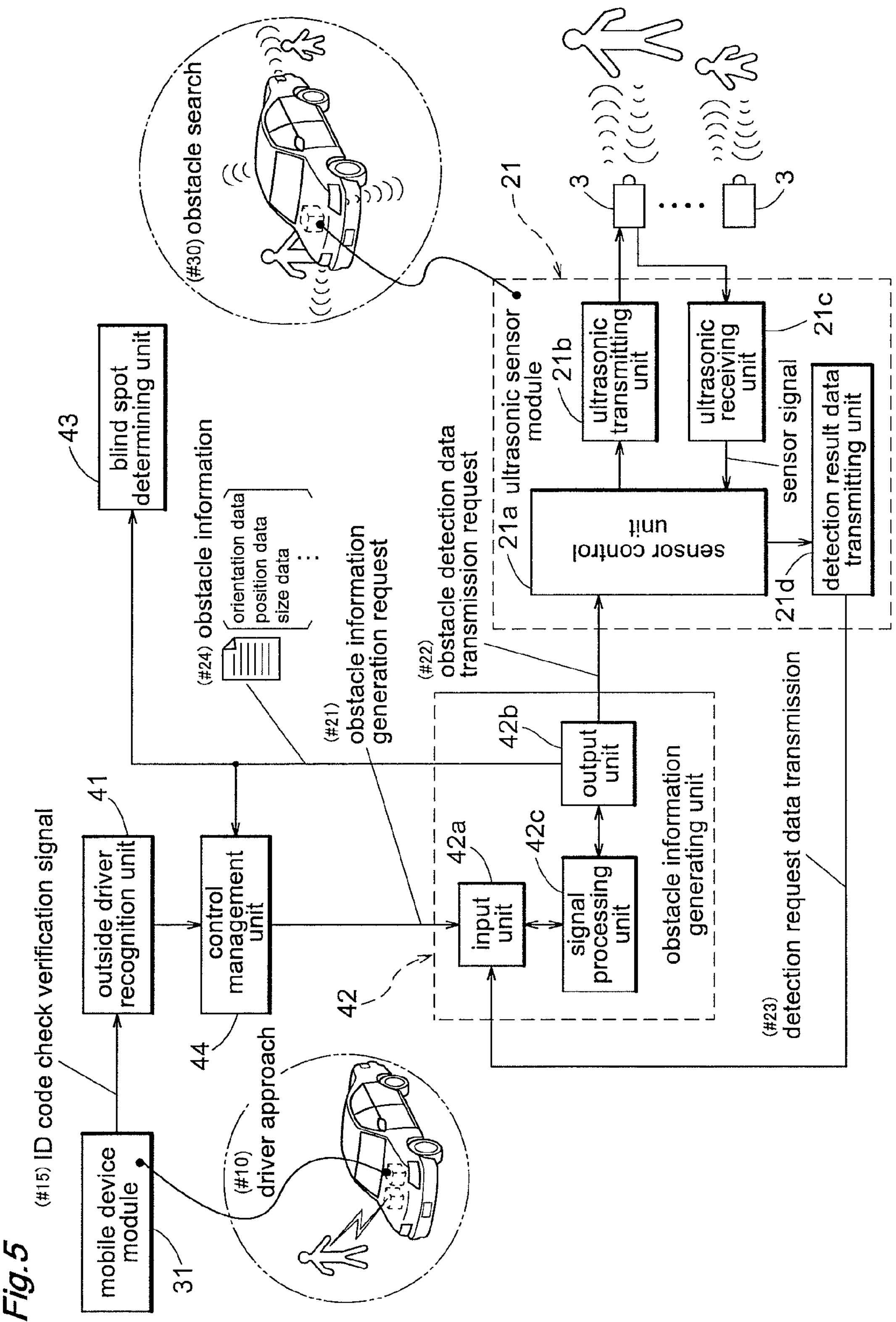
FIG. 5 is a schematic diagram showing control operations for generating information on an obstacle present in the surroundings of a vehicle.

FIG. 5 schematically shows the devices operated from Step #20 to Step #30 in FIG. 2 and the controlled behavior of these devices. The outside driver recognition unit 41 in the monitoring control unit 40 receiving ID code check confirmation signals from the mobile device module 31 sends a request to the obstacle information generating unit 42 via the control management unit 44 for the generation of obstacle information related to an obstacle present in the area surrounding the vehicle (#21). The obstacle information generating unit 42 receiving an obstacle information generation request sends a request to the obstacle detection unit 20 for obstacle detection data (#22). In this embodiment, the obstacle detection unit 20 includes an ultrasonic sensor module 21 and a monitoring camera module 22. Here, the ultrasonic sensor module 21 is used.

The ultrasonic sensor module 22 includes a sensor control unit 21*a*, an ultrasonic transmitting unit 21*b*, an ultrasonic receiving unit 21*c*, and a detection result data transmitting unit 21*d*. In the ultrasonic sensor module 22 receiving a request for obstacle detection data, the sensor control unit 21*a* controls the ultrasonic transmitting unit 21*b* and the ultrasonic receiving unit 21*c*, and the plurality of ultrasonic sensors installed in the area surrounding the vehicle are simultaneously or sequentially driven to scan the area surrounding the vehicle with ultrasonic waves. In this scanning process, when there is an obstacle present, ultrasonic waves transmitted from the ultrasonic sensors 3 are reflected by the obstacle and returned. Thus, the distance from the obstacle can be calculated based on the arrival time of the reflected waves. Detected distance data is linked as detection result data to the sensor ID of the ultrasonic sensors 3 used in the detection process, so the ultrasonic sensors 3 detecting the obstacle can be identified. Therefore, the orientation and distance of a detected obstacle relative to the vehicle can be determined from the detection data. Depending on the situation, the size of the obstacle can be determined from the intensity of the reflection.

The detection result data is sent from the obstacle detection unit 20 to the obstacle information generating unit 42 (#23). In the obstacle information generating unit 42, the detection result data received via the input unit 42*a* is processed by the data processing unit 42*c*. When an obstacle has been detected, the orientation data, position data, and size data for the obstacle is determined, and obstacle information composed of this data is generated. This obstacle information is sent to the control management unit 44. In this embodiment, there is installed a blind spot determining unit 43 which is explained in greater detail below. The obstacle information is also sent to this blind spot determining unit 43 (#24).

Figure 6:
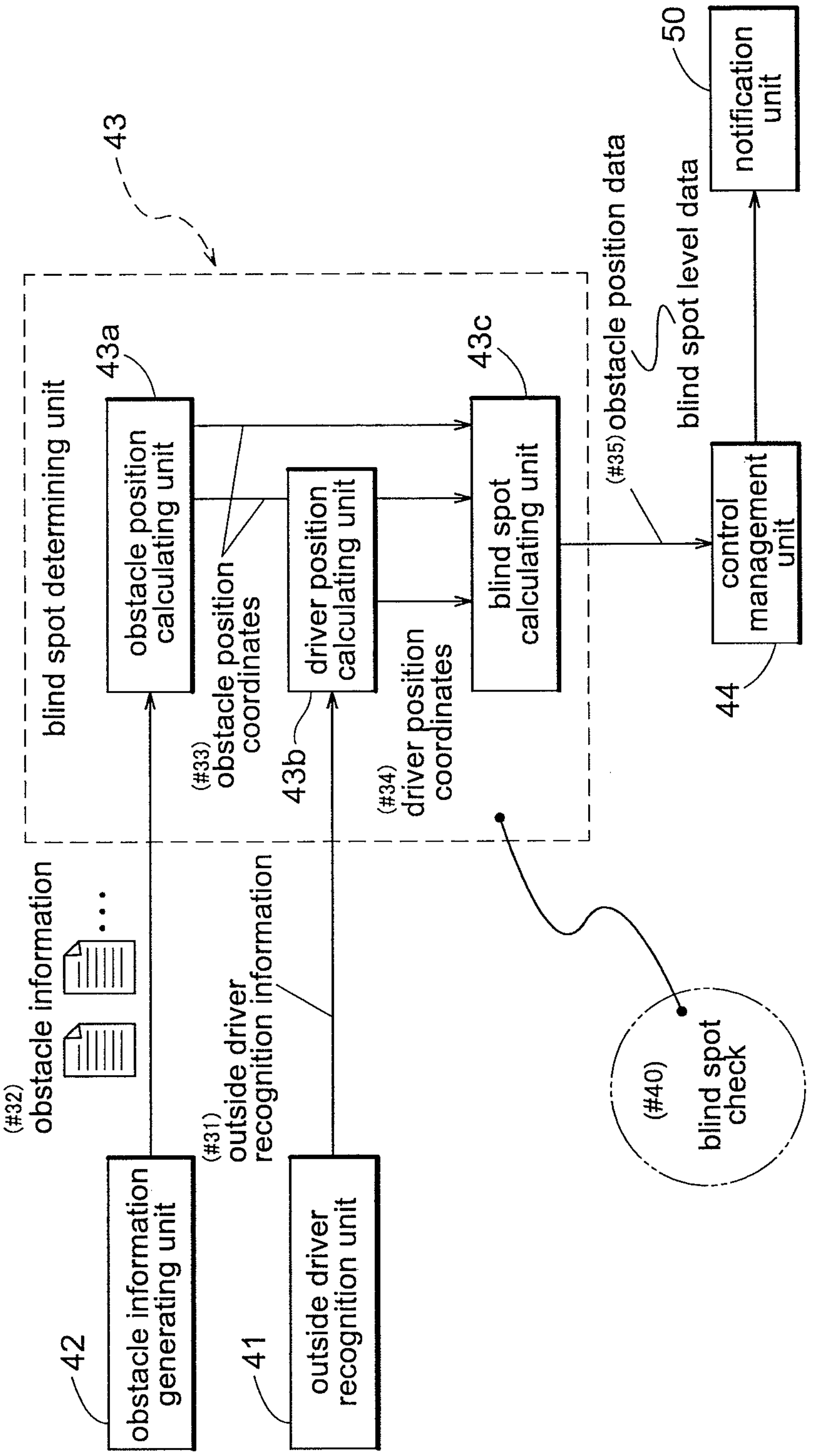
FIG. 6 is a schematic diagram showing control operations for calculating a blind spot between a driver and an obstacle.

FIG. 6 schematically shows the devices operated and the controlled behavior of these devices in the blind spot check step #40 which can be optionally embodied between Step #30 and Step #50 in FIG. 2. The outside driver verification information indicating the presence of the driver outside of the vehicle is inputted from the outside driver recognition unit 41 to the blind spot determination unit 43 built into the monitoring control unit 40 (#31). Also, the obstacle information described above is inputted from the obstacle information generating unit 42 (#32). Because orientation data, position data, and size data for each obstacle (reflective object) is included in the obstacle information based on the detection result data from the ultrasonic sensor module 22. As a result, the driver can be notified of the characteristics of various obstacles. When obstacle information is inputted over time, the movement of obstacles can be ascertained.

The obstacle position calculating unit 43*a*, the driver position calculating unit 43*b*, and the blind spot calculating unit 43*c* in the blind spot determining unit 43 are substantially composed of computer programs. When the inputted obstacle information includes detection result data for more than one obstacle, the obstacle position calculating unit 43*a* calculates the position coordinates for the various obstacles using the vehicle coordinate system, and the relative positions of the obstacles relative to the vehicle are outputted (#33). When outside driver recognition information is inputted along with the obstacle information, there is a possibility that the driver is included among the obstacles in the obstacle information. Here, the driver position calculating unit 43*b* determines that the obstacle near the driver side door (here, the front right door) or the obstacle approaching the driver side door is the driver. It calculates the coordinates at this position (the position of the driver) and outputs the position relative to the vehicle (#34). The blind spot calculating unit 43*c* calculates whether or not there is an obstacle in the blind spot area of the driver based on the driver position coordinates and the obstacle position coordinates. In the blind spot level data, the possibility of an obstacle entering the blind spot area is classified using three levels. When there is hardly any possibility of an obstacle entering the driver's blind spot area, the blind spot level equals 0. When the possibility is somewhere in the middle, the blind spot level equals 1. When the possibility is very high (e.g., the obstacle is near the left rear wheel), the blind spot level equals 2. Blind spot level data obtained in this manner is linked to the obstacle position data, and transferred to the control management unit 44 (#35). The control management unit 44 can then send an instruction to the notification unit 50 to notify the driver of information related to obstacles in the blind spot based on the blind spot level data and the obstacle position data.

Figure 7:
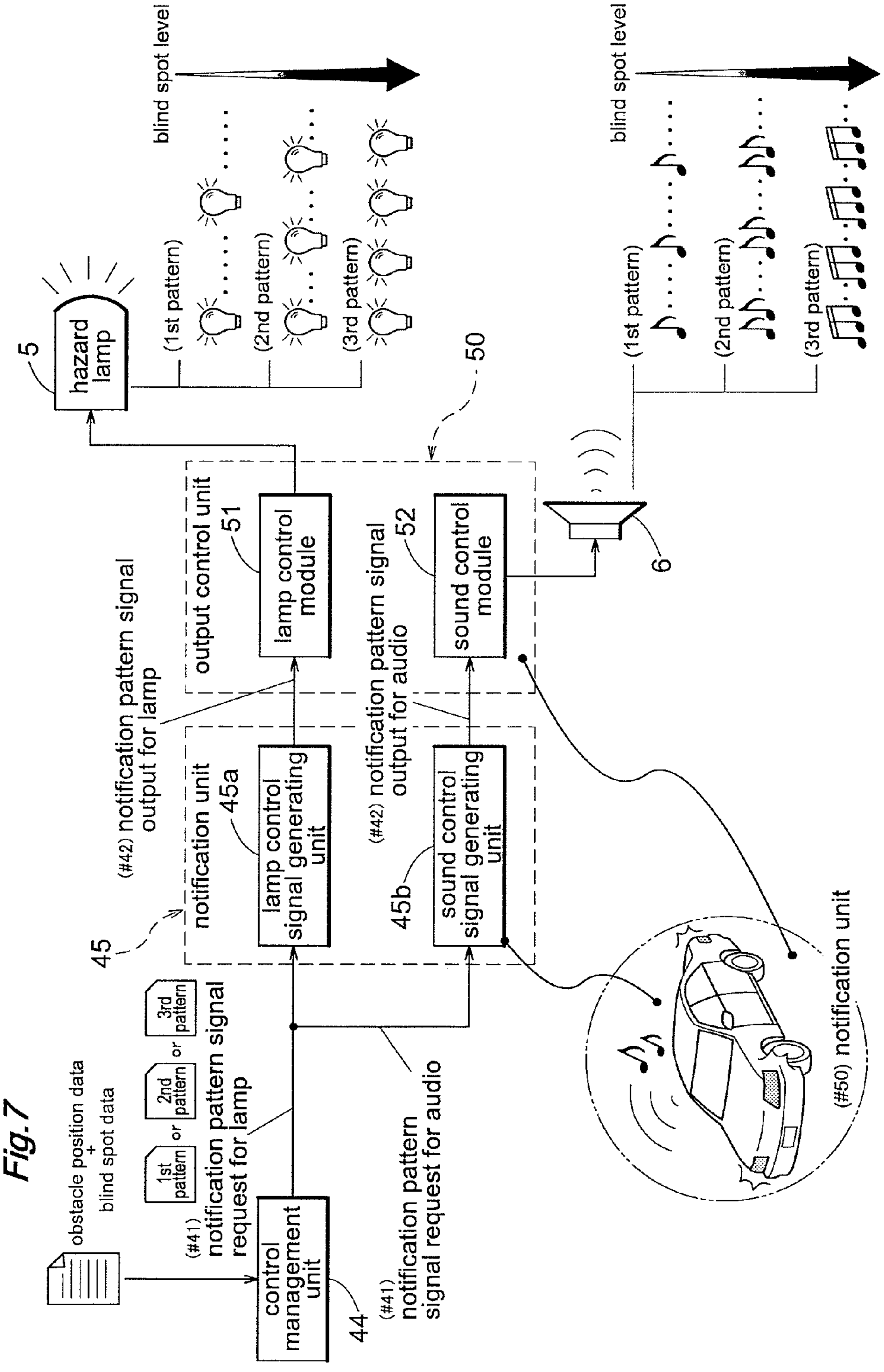
FIG. 7 is a schematic diagram, showing control operations for notifying of obstacle information.

FIG. 7 schematically shows the devices operated from Step #50 to Step #60 in FIG. 2 and the controlled behavior of these devices. When blind spot level data is received along with the obstacle position data, the control management unit 44 controls the output control unit 50, and a lamp 5 such as the hazard lamp, a buzzer speaker (including a buzzer) 6, or both are activated so that the driver is notified of information related to an obstacle present in the area surrounding the vehicle. Here, the information related to the obstacle is information notifying and suggesting to the driver that the area surrounding the vehicle should be checked for the presence of obstacles. This can be done using a flashing hazard lamp 5 or a warning sound. The minimum goal is achieved by having the hazard lamp 5 flash, or a warning buzzer sound, only in instances where the obstacle is detected in the surroundings of the vehicle. In cases in which there is a high possibility that the obstacle will be clearly seen by the driver before entering the vehicle, notification of obstacle information can be performed only when necessary so as not to inconvenience the driver. However, when an obstacle is present in the blind spot area of the driver, there is a higher need than usual to notify the driver of obstacle information than in cases in which an obstacle is not present. Therefore, it is important to proactively alert the driver so that the driver can go around to the other side of the vehicle to check the area surrounding the vehicle.

Thus, in this embodiment, the control management unit 44 sends control signals to the notification unit 45 based on blind spot level data calculated by the blind spot determining unit 43 in order to notify the driver using different patterns. In other words, when the blind spot level equals zero, the control management unit 44 sends a request to the lamp control signal generating unit 45*a* of the notification unit 45 to generate first notification pattern signals as the lamp control signals to be sent to the lamp control module 51 (#41). When this request has been received, the lamp control signal generating unit 45*a* outputs predetermined first notification pattern signals for the lamp to the lamp control module 51 (#42). The lamp control module 51 adds the lamp operating signals corresponding to the first notification pattern signals for the lamp to the hazard lamp 5 and, for example, the hazard lamp 5 flashes at a comparatively long interval which is flashing pattern 1 (#42).

Similarly, when the blind spot level equals one, the control management unit 44 sends a request to the lamp control signal generating unit 45*a* to generate second notification pattern signals, and the lamp control module 51 adds the lamp operating signals corresponding to the second notification pattern signals for the lamp to the hazard lamp 5 and, for example, the hazard lamp 5 flashes at a shorter interval than the flashing pattern 1, as flashing pattern 2. Also, when the blind spot level equals two, the control management unit 44 sends a request to the lamp control signal generating unit 45*a* to generate third notification pattern signals, and the lamp control module 51 adds the lamp operating signals corresponding to the third notification pattern signals for the lamp to the hazard lamp 5 and, for example, the hazard lamp 5 flashes at a very short interval which is flashing pattern 3. At this time, having a plurality of hazard lamps 5 flash in an alternating manner such as having a row of lamps flash sequentially is preferred in order to prompt the driver to go around to the other side of the vehicle and check for obstacles.

When a buzzer or speaker 6 is used as the notification device, the notification is performed in a manner that is substantially similar to the use of the hazard lamps 5 described above. In other words, the control management unit 44 sends a first, second or third notification pattern signal generating request to the sound control generating unit 45*b* when the blind spot level is, respectively, one, two or three. The sound control module 52 then adds speaker activation signals to the buzzer or speaker 6 which correspond to the first, second, or third notification pattern signals. The buzzer or speaker 6 can generate a fairly inconspicuous sound for sound pattern 1, a general warning sound for sound pattern 2, and an alarm sound which causes tension for sound pattern 3. When the blind spot level is three, a voice can also be used to indicate the blind spot area to the driver so that the driver is prompted to go around the vehicle to the blind spot and check for the obstacle.

The notification of obstacle information can be limited to situations with a blind spot level of two or three. When the blind spot level is one, notification of obstacle information is not performed.

The notification device does not have to be installed in the vehicle. A device outside of the vehicle can be used as the notification device in the present invention as long as it can exchange data (communicate) with the vehicle. For example, a vibration function, sound output function, or light display function incorporated into a vehicle key (including the IC card 2), mobile telephone, or a communication-type mobile information device carried by the driver can be used as the notification device in the present invention.

Notifying a driver outside the vehicle of obstacle information related to the presence of an obstacle in the area surrounding the vehicle is ended when the driver enters the vehicle. Entry of the driver into the vehicle can be deduced based on the door opening/closing detection signals from the door opening/closing module 33. Operation of the seat belt and ignition switch can also be used.

Figure 8:
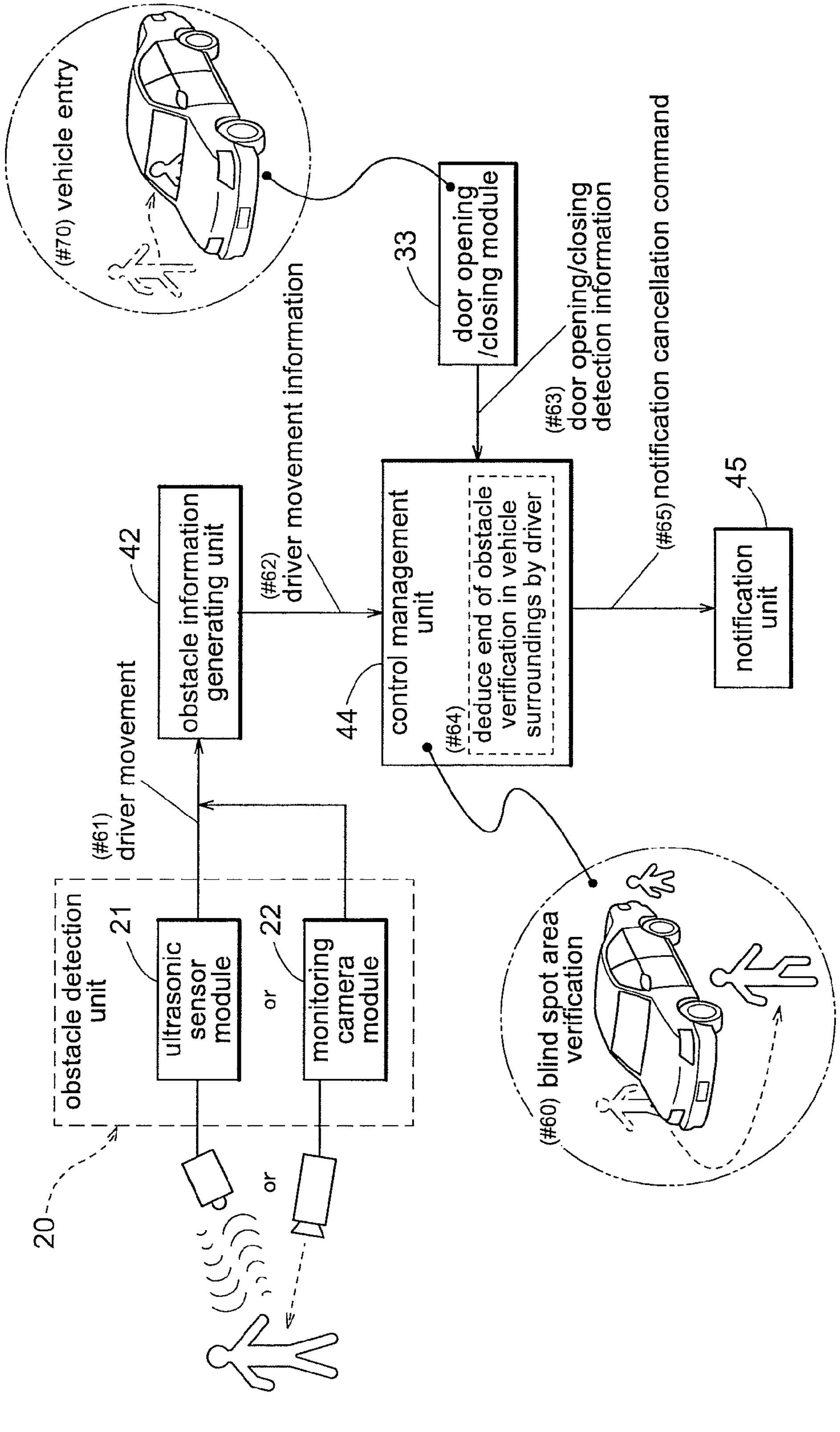
FIG. 8 is a schematic diagram showing control operations for deducing whether the driver has looked around for obstacles in the blind spot.

In this embodiment, the driver preferably goes around to the blind spot area and checks to see whether there is an obstacle when blind spot level three is generated. FIG. 8 schematically shows the devices and the controlled behavior of the devices operated when an obstacle is verified.

When a sound is generated by the speaker 6 or the hazard lamp flashes in a unique way to get the attention of the driver, the driver reaching for the door 10 and about to enter the vehicle senses that something is wrong. As a result, he or she stops getting into the car and looks around the area surrounding the vehicle. The movement of the driver can be detected by the ultrasonic sensor module 21 or the monitoring camera module 22 (#61). The notification information from the obstacle detection unit 20, which changes over time, is generated by the obstacle information generating unit 42 as driver movement information, and this is sent to the control management unit 44 (#62). When the driver has looked around the area surrounding the vehicle, including the blind spot area, returned to the driver side door 10, opened the door 10, and got inside the driver seat, door opening/closing information is sent from the door opening/closing module 33 to the control management unit 44 (#63). The control management unit 44 deduces that the driver has stopped checking for obstacles in the area surrounding the vehicle based on driver movement information and door opening/closing detection information (#64), and a notification cancellation command is sent to the notification unit 45 (#65).

Other Embodiments (1) In the embodiment described above, radio communication with an IC card carried by the driver as part of a smart entry system was used to recognize the driver approaching the vehicle or about to enter the vehicle. However, in addition to this method, communication with various types of radio portable devices carried by the driver can be used as means for recognizing people. Also, an onboard camera can be used to recognize a driver about to enter the vehicle based on facial recognition image processing. When images are taken using the onboard camera to detect an obstacle in the area surrounding the vehicle, both driver recognition and obstacle detection can be realized using image processing technology for these images.

(2) The timing for notifying a recognized driver outside of the vehicle of obstacle information is preferably when the driver has entered an area in which notification using sound and light can be sensed. For example, when a sensor has been installed to detect when the driver touches a vehicle door, detection from this sensor can be used as a trigger for notifying the driver of obstacle information. When the door unlocking sound is used to notify the driver of obstacle information, detection of a person by the door handle sensor is preferably used as the trigger for notifying the driver of obstacle information. When obstacle information can be generated at high speed, the generation of obstacle information is started using detection of a person by the door handle sensor, and the driver is notified of obstacle information as soon as the door is opened. This shortens the operating time of the apparatus for monitoring the surroundings of a vehicle and reduces the amount of power consumed. The presence of the driver in the area can also be confirmed using images taken with the onboard camera before notifying the driver of obstacle information.

(3) When the vehicle has been backed into a parking space in a parking lot and it has been determined (deduced) that the vehicle cannot move back any further, the driver can be notified of obstacle information only when an obstacle is present in front of the vehicle. Similarly, when the vehicle has been driven forward into a parking space in a parking lot and it has been determined (deduced) that the vehicle cannot move forward any further, the driver can be notified of obstacle information only when an obstacle is present to the rear of the vehicle. Also, when the vehicle has been backed into a parking space but departs by moving forward, the driver can be notified of obstacle information only when an obstacle is present in front of the vehicle.

INDUSTRIAL APPLICABILITY

An apparatus for monitoring the surroundings of a vehicle according to the present invention can be applied to various types of vehicles in the field of monitoring the surroundings of a vehicle in which a driver outside of a vehicle is notified about obstacle information related to the presence of obstacles in the surroundings of the vehicle.

The invention claimed is:

1. An apparatus for monitoring the surroundings of a vehicle comprising:

an outside driver recognition unit for recognizing a driver approaching the vehicle;

an obstacle detection unit including an ultrasonic sensor or a camera for detecting the presence of an obstacle in the surroundings of the vehicle using the ultrasonic sensor or the camera;

an obstacle information generating unit for generating obstacle information related to the detected presence of the obstacle in the surroundings of the vehicle;

a notification unit for notifying the recognized driver outside of the vehicle of the obstacle information from the obstacle information generating unit; and a blind spot determining unit for determining, based on the obstacle information, whether or not the obstacle is present in a blind spot area of the driver recognized by the outside driver recognition unit, the notification unit notifying the driver outside of the vehicle of the obstacle information when the obstacle is present in the blind spot area.

2. The apparatus for monitoring the surroundings of a vehicle according to claim 1, wherein the obstacle information generating unit begins to generate the obstacle information in response to the outside driver recognition unit having recognized the driver approaching the vehicle.

3. The apparatus for monitoring the surroundings of a vehicle according to claim 1, wherein the notification unit has a sound control signal generating unit for generating sound control signals for outputting a sound to notify the driver outside of the vehicle of the presence of the obstacle; and the sound control signals are sent to a sound control module for driving and controlling a sound output device.

4. The apparatus for monitoring the surroundings of a vehicle according to claim 3, wherein the sound output device is a device for activating an unlocking sound for vehicle doors; and there is activated a sound which is different from a usual unlocking sound as a sound for notifying of the presence of the obstacle.

5. The apparatus for monitoring the surroundings of a vehicle according to claim 1, wherein a smart entry system is installed in the vehicle as the outside driver recognition unit; and the obstacle information generating unit begins to generate the obstacle information in response to communication being established with a mobile device being carried by the driver.

6. The apparatus for monitoring the surroundings of a vehicle according to claim 1, wherein position coordinates surrounding the vehicle regarding the driver recognized by the outside driver recognition unit are provided, whereby the blind spot determining unit calculates the blind spot area of the driver surrounding the vehicle based on the position coordinates.

7. The apparatus for monitoring the surroundings of a vehicle according to claim 1, wherein the notification unit generates control signals for outputting sound, light, or both to notify the driver of the presence of the obstacle.

8. The apparatus for monitoring the surroundings of a vehicle according to claim 1, wherein the notification unit is provided in at least one of a vehicle key, an IC card, a mobile telephone, and a communication-type mobile information device.

9. A method of monitoring the surroundings of a vehicle, comprising the steps of:

recognizing a driver approaching the vehicle;

searching for obstacles present in the surroundings of the vehicle;

detecting the presence of an obstacle in the surroundings of the vehicle using an ultrasonic sensor or a camera;

determining whether or not the obstacle is present in a blind spot area of the driver based on the detected presence of the an obstacle in the surroundings of the vehicle:

generating obstacle information related to a searched and found obstacle when the obstacle is present in the blind spot area; and notifying the driver outside of the vehicle of the obstacle information.

10. A method of monitoring the surroundings of a vehicle, comprising the steps of:

recognizing a driver approaching the vehicle via communication with a mobile communication device carried by the driver;

searching for obstacles present in the surroundings of the vehicle;

detecting the presence of an obstacle in the surroundings of the vehicle using an ultrasonic sensor or a camera;

determining whether or not a searched and found obstacle is present in a blind spot area of the driver based on the detected presence of the an obstacle in the surroundings of the vehicle; and notifying the driver outside of the vehicle of obstacle information related to the obstacle when the obstacle is present in the blind spot area of the driver.

11. A method of monitoring the surroundings of a vehicle according to claim 10, further comprising the steps of:

determining movement of the driver into the blind spot area; and ending notification in response to the driver moving into the blind spot area.

* * * * *